Figure 1:
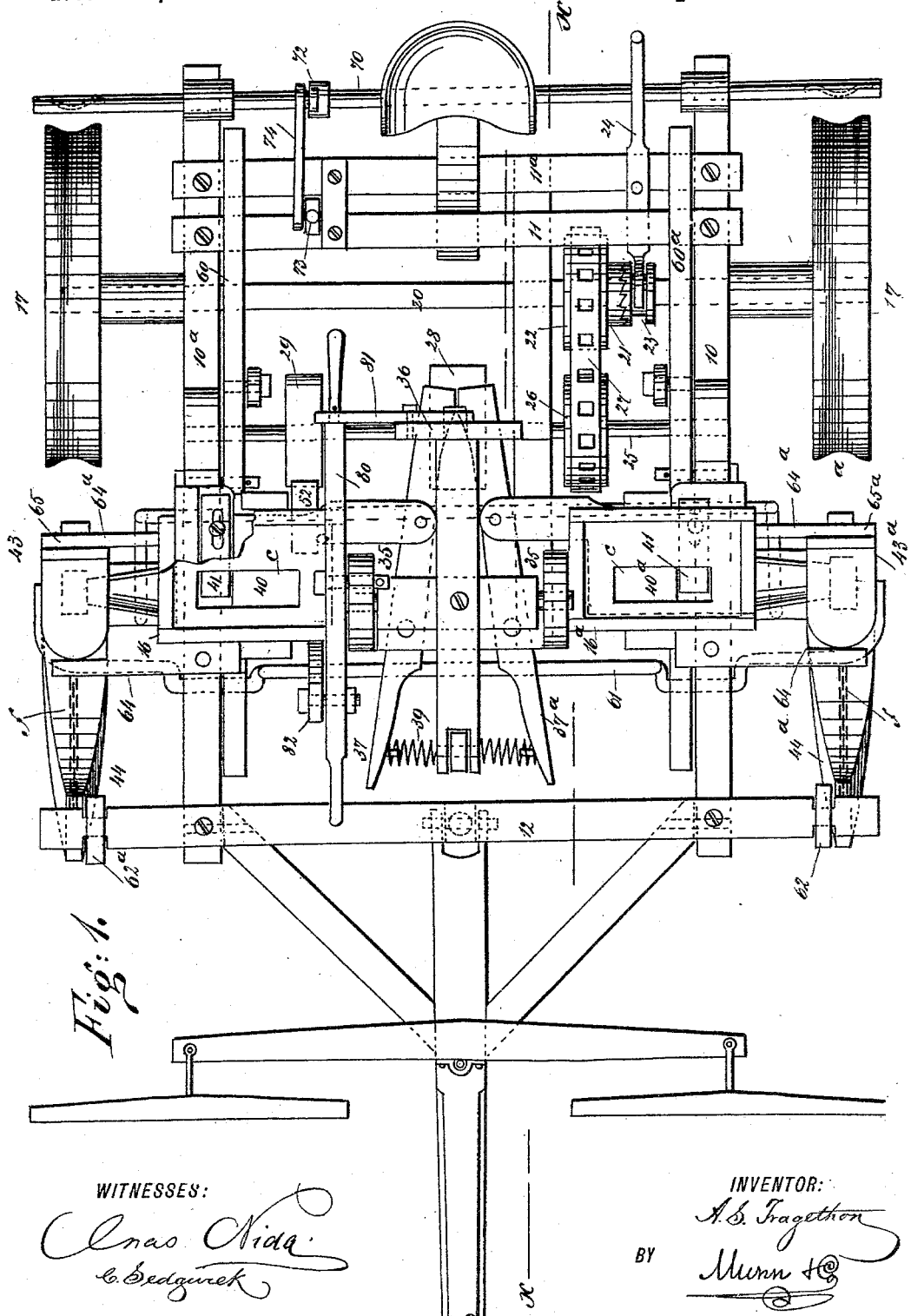

(No Model.)  3 Sheets—Sheet 1.

A. S. TRAGETHON.
PLANTER.

No. 411,626.  Patented Sept. 24, 1889.

WITNESSES:  INVENTOR:
A. S. Tragethon
BY
Munn & Co.
ATTORNEYS.

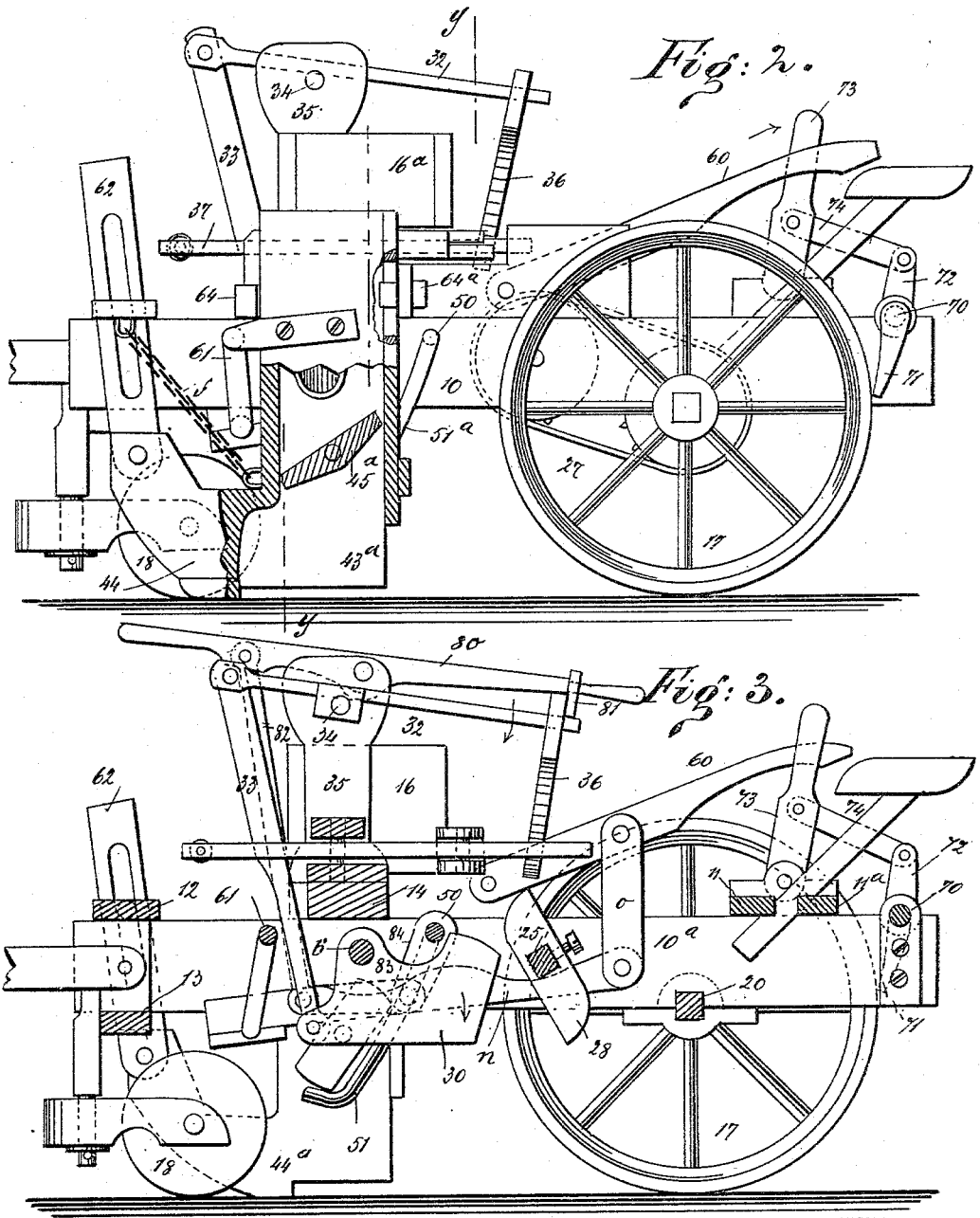

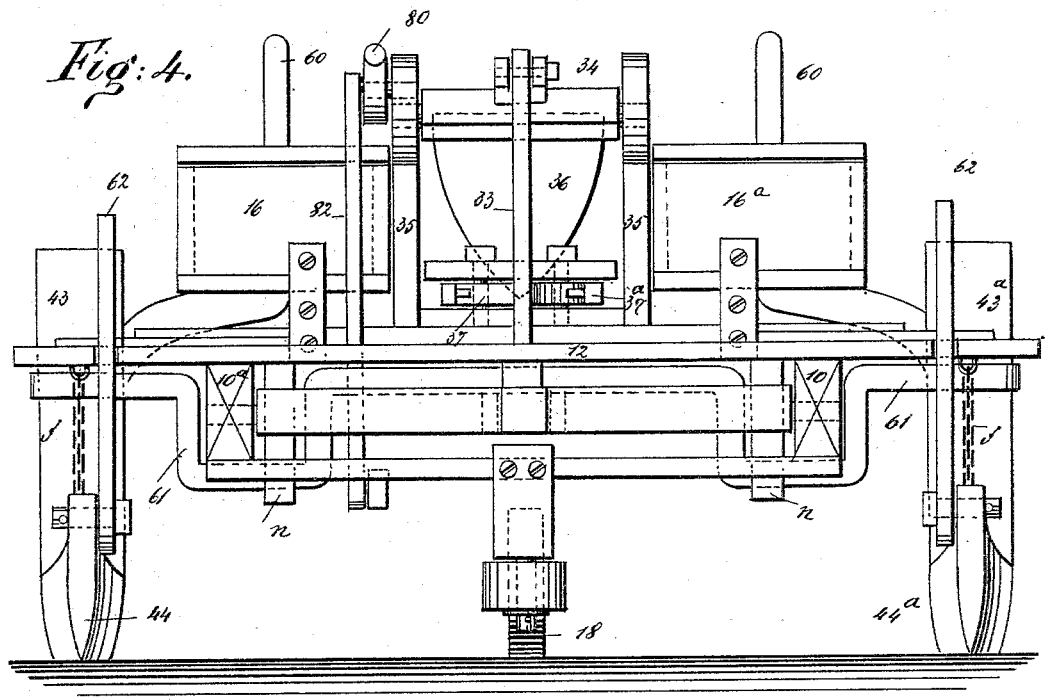
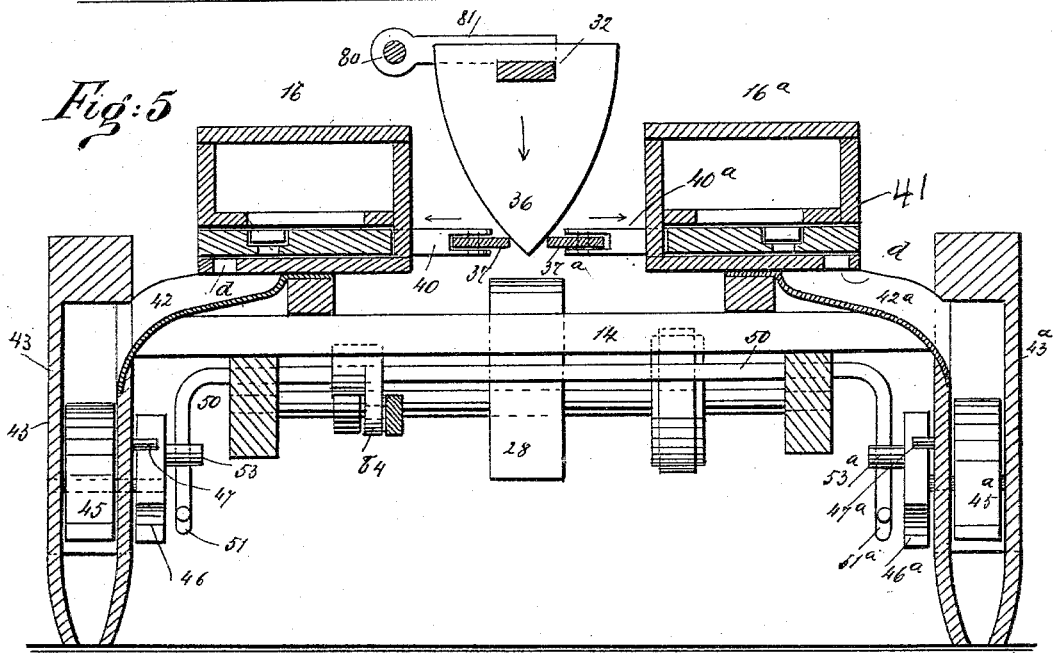

UNITED STATES PATENT OFFICE.

ARNE SEVERSON TRAGETHON, OF BROOKFIELD, IOWA.

PLANTER.

SPECIFICATION forming part of Letters Patent No. 411,626, dated September 24, 1889.

Application filed April 26, 1889. Serial No. 308,709. (No model.)

*To all whom it may concern:*

Be it known that I, ARNE SEVERSON TRAGETHON, of Brookfield, in the county of Worth and State of Iowa, have invented a new and Improved Planter, of which the following is a full, clear, and exact description.

This invention relates to planters for cereals—such as corn—the object of the invention being to provide a machine in which the planting may be brought about by means of a hand-lever, or wherein the planting may be brought about through the medium of a driving-wheel and proper connections, the invention consisting of certain novel constructions, arrangements, and combinations of elements, to be hereinafter described, and specifically pointed out in the claims.

Reference is to be had to the accompanying drawings, forming a part of this specification, in which similar figures and letters of reference indicate corresponding parts in all the views.

Figure 1 is a plan view of my improved planter. Fig. 2 is a side view thereof, one of the seed-delivery tubes being shown in section. Fig. 3 is a sectional elevation on line $xx$ of Fig. 1. Fig. 4 is a front view of the planter, and Fig. 5 is a cross-sectional elevation on line $yy$ of Fig. 2.

In the drawings, 10 and $10^a$ represent two horizontal beams, the rear ends of which are connected by transverse beams 11 and $11^a$, while the forward ends are connected by a beam 12, which is secured to the upper faces of the beams 10 and $10^a$ and by a beam 13, secured beneath the beams. To the rear of the beam 12, I arrange a cross-beam 14, above which the seed boxes or hoppers 16 and $16^a$ are located. The parts above described are supported by wheels 17, the peripheral faces of which are formed with grooves $a$ and by a caster-wheel 18, that is mounted at the front, as best shown in Fig. 3.

Upon the axle 20, to which one of the wheels 17 is rigidly connected, I mount a clutch-section 21, which is provided with a sprocket-wheel 22, the sprocket-wheel being loosely mounted on the axle; and in connection with the clutch-section 21, I arrange a second clutch-section 23, which is mounted to slide upon and to turn with the axle 20, an operating-lever 24 being arranged in connection with the clutch-section 23, so that when the parts are adjusted as represented in Fig. 1 the sprocket or chain wheel 22 will turn with the axle 20.

In advance of the axle 20 there is arranged a transverse shaft 25, which carries a sprocket or chain wheel 26, that is engaged by a chain 27, that runs in engagement with the sprocket-wheel 22, and upon the shaft 25, I also mount cam-faced blocks 28 and 29, the block 28 turning in the path of a counterbalanced block or lever 30, that is pivotally mounted at $b$. The block or lever 30 is connected to a lever 32 by a connecting-rod 33, the lever 32 being supported by a rock-shaft 34, that is mounted in standards 35, which extend upward from the beam 14. The lever 32 carries a wedging-block or double-faced cam 36, the point of which bears against levers 37 and $37^a$, that are fulcrumed upon the beam 14 and normally held in the position in which they are shown in Fig. 1 by a double spring 39, which is mounted between the forwardly-extending ends of the said levers 37 and $37^a$, the said levers being pivotally connected to slides 40 and $40^a$, which ride within the seed boxes or hoppers 16 and $16^a$. The bottoms of said seed-boxes are slotted, as shown at $c$, while the slides are transversely slotted to receive a charge of seed from the seed boxes or hoppers, the amount of seed received at each reciprocation of the slides being regulated by plates or blocks 41, that are adjustably held within the slide-recesses. As the slides are reciprocated, their slots or openings are carried into register with apertures $d$ and charges of seeds are delivered to conveyer-chutes 42 and $42^a$, which lead to chutes 43 and $43^a$, that are arranged just to the rear of the furrow-openers 44 and $44^a$.

In the chutes 43 and $43^a$ are mounted tilting plates 45 and $45^a$, and to the pivotal supports of these plates I connect blocks 46 and $46^a$, that are so proportioned that they will normally rest against stop or limit pins 47 and $47^a$. In order that the plates 45 and $45^a$ may be tilted at just the proper time, I provide a shaft 50, having downwardly-extending projections 51 and $51^a$ and carrying a block 52, which extends into the path of the cam 29, so that at every revolution of the cam the rear end of the block 52 will be depressed and the projections 51 and $51^a$ will be thrown forward, so as to bear against projections 53 and 53ª, that are carried by the blocks 46 and 46ª, the weight of the arms or projections 51 and 51ª acting to return the shaft 50 to its normal position immediately upon the clearance of the cam 29 from the block 52.

In order that the depth of the furrow may be regulated and the furrow-openers and the parts carried thereby raised, I provide levers 60 and 60ª, that are pivotally connected to the side beams 10 and 10ª and by means of the levers n and links o to a transverse shaft or rod 61, which said shaft is rigidly connected to the structures 43 and 43ª, which constitute the seed-delivery chutes, the arrangement being such that by depressing the levers 60 and 60ª the shaft 61 will be carried upward, and in so moving upward will carry the furrow-openers, which furrow-openers are rigidly connected to the structures 43 and 43ª, the forward ends of the furrow-openers being guided at this time by upwardly-extending plates 62 and 62ª, that are slotted to engage the ends of the cross-beam 12, the structures 43 and 43ª being guided by laterally-extending projections 64 and 64ª, the projections 64ª being provided with forwardly-extending projections 65 and 65ª, that ride in slots formed in the rear walls of the structures 43 and 43ª; and in order that all undue depression of the furrow-openers may be avoided I provide said furrow-openers with chains f, which are connected to the ends of the beam 12.

From the construction above described it will be seen that as the machine is drawn forward furrows will be opened and the charges of seed will be deposited at stated intervals, the forward movement of the axle 20 transmitting a rotary motion to the shaft 25, through the medium of the chain 27 and the sprocket-wheels in connection with which it runs, and as the shaft 25 revolves its cam-block 28 will bear upon the lever or block 30 and force said lever downward in the direction of the arrows shown in connection therewith in Fig. 3, and as the lever 30 so moves downward the lever 32 will be moved as indicated by its arrow, and the wedging-block 36 will be forced downward between the inner ends of the levers 37 and 37ª, forcing the said inner ends of the levers apart and carrying the slide-recesses to a position such that they will register with the delivery-openings d, that lead to the chutes 42 and 42ª, said chutes communicating with the chutes 43 and 43ª, the seed to be planted passing downward and onto the tilting plates 45 and 45ª, to be dumped therefrom into the furrow as the shaft 50 is rocked, in the manner hereinbefore set forth.

After the seed has been deposited the wheels 17, which, as before stated, are formed with concave peripheral faces, will in advancing cover the seed.

With a machine of this class it is necessary that the dropping be brought about at uniform intervals, which would not be possible if mud were allowed to accumulate upon the wheel-tires, and consequently I have found it advisable to provide the machine with a transverse shaft 70, which carries scrapers 71, and an upwardly-extending lever 72, that is connected to an operating-lever 73 by a link 74, the arrangement being such that by throwing the lever 73 in the direction of the arrow shown in connection therewith the scrapers will be brought to bear upon the wheels 17.

As organized and described, the machine is designed to plant in hills that are three feet six inches apart; but in certain instances it might be desirable to plant the seed at shorter intervals, and to that end I would furnish the axle 20 with a wheel double the diameter of the wheel 22, and provide for the lengthening of the chain 27, so that it might run in engagement with the wheel 26 and the large wheel just referred to.

In certain cases it might be deemed desirable or advisable to bring about the dropping of the seed by hand, and to this end I provide a lever 80, which is pivotally mounted upon the standard 35 and connected to the wedging-block 36 by a cross-bar 81, the lever 80 being connected with the shaft 50 by a connecting rod or link 82 and a link 83, which extends to a crank-arm 84, that is rigidly connected to the shaft 50, so that by reciprocating the lever 80, I am able to plant the corn at such distance apart as may be required.

When the machine is used for drilling or planting hills at very short distances apart, it is desirable that the tilting plates 45 and 45ª should be locked in an open position, and to that end I would provide wedging-blocks, which might be inserted between the chute-structures 43 and 43ª and the blocks 46 and 46ª, or any proper means could be employed for holding the plates in an open position.

By means of the construction above described I entirely dispense with the use of gearing, and by providing the planter with a forward caster-wheel I relieve the draft-animals of any undue weight and secure a planter which is of light draft, is not liable to get out of order, and which may be run by unskilled labor.

Having thus described my invention, I claim as new and desire to secure by Letters Patent—

1. In a planter, the combination, with a main frame, of the combined furrow-openers and feed-delivery chutes, the double crank-shafts connecting the furrow-openers, levers for operating said crank-shaft, links connecting the crank-shaft and levers, and the slotted guides attached to the forward end of the furrow-openers and to the main frame, substantially as shown and described.

2. In a planter, the combination, with hoppers 16 and 16ª, of slides 40 and 40ª and blocks 41, adjustably mounted in recesses formed in the slides, the levers 37 and 37ª, pivotally connected with the slides 40 and 40ª, respectively, a double spring 39, carried between the forward ends of said levers, the double cam-faced block 36, and the lever 32, for carrying and operating said block, all arranged and adapted to operate substantially as shown and described.

3. In a planter, the combination, with an axle, of a shaft arranged in advance thereof, chain-wheels carried by the axle and shaft, a chain arranged in connection with such wheels, a cam-faced block 28, a weighted lever 30, a link 33, a lever 32, a wedging-block 36, levers 37 and 37ª, and slides 40 and 40ª, all substantially as described.

4. In a planter, the combination, with the shaft 25 and a means for driving the same, of cam-faced blocks 28 and 29, carried by the shaft, a lever 30, a wedging-block 36, connections between the lever 30 and the wedging-block, seed-boxes, slides arranged in connection therewith, levers 37 and 37ª, to which the slides are connected and upon which the wedging-block 36 acts, furrow-openers, seed-delivery chutes arranged to the rear thereof, tilting plates arranged in the seed-delivery chutes, a shaft 50, having forwardly-extending arms which bear upon projections carried by the tilting plates, and a projection which is borne upon by the cam-faced block 29, substantially as described.

5. In a planter, the combination, with the chutes 43 and 43ª, of the tilting plates 45 and 45ª, mounted, respectively, within the same, the blocks 46 and 46ª, connected to the pivotal supports of said blocks and adapted to rest against the stop or limit pins 47 and 47ª, a shaft 50, having downwardly-extending projections 51 and 51ª and carrying a block 52, which extends in the path of the cam 29, all arranged and adapted to operate substantially as shown and described.

6. In a planter, the combination, with the main frame, of the seed-hoppers 16 and 16ª, mounted thereon, the slides 40 and 40ª, reciprocating therein, the levers 37 and 37ª, pivotally connected to said slides and having the double spring 39 between the forward ends of said levers, the double cam-faced block 36, for operating said levers, the upright standard 35, mounted upon the main frame, the lever 80, pivoted thereto, the cross-bar 81, connecting the lever and cam-faced block, the connecting-rod 82 and link 83, extending to a crank-arm 84, and the shaft 50, connected with the delivery-chutes 43 43ª, substantially as described, and for the purpose set forth.

ARNE SEVERSON TRAGETHON.

Witnesses:
SYVER A. TRAGETHOEN,
O. NILSEN.